United States Patent
Less et al.

(10) Patent No.: US 11,491,418 B2
(45) Date of Patent: Nov. 8, 2022

(54) FLOATING ASSEMBLY OF INCLINED CHANNELS WITH AN APPLIED ELECTRICAL FIELD FOR THE ACCELERATED ELECTROSTATIC SEPARATION OF WATER-IN-OIL DISPERSIONS

(71) Applicant: SAUDI ARABIAN OIL COMPANY, Dhahran (SA)

(72) Inventors: Simone Less, Dhahran (SA); Sebastien Duval, Dhahran (SA); Olanrewaju Malcolm Oshinowo, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 313 days.

(21) Appl. No.: 16/698,428

(22) Filed: Nov. 27, 2019

(65) Prior Publication Data
US 2021/0154599 A1    May 27, 2021

(51) Int. Cl.
*B01D 17/06* (2006.01)
*B01D 17/02* (2006.01)
(Continued)

(52) U.S. Cl.
CPC .......... *B01D 17/06* (2013.01); *B01D 17/0211* (2013.01); *B01D 17/0214* (2013.01);
(Continued)

(58) Field of Classification Search
CPC ............ B01D 17/0211; B01D 17/0214; B01D 17/042; B01D 17/047; B01D 17/06;
(Continued)

(56) References Cited

U.S. PATENT DOCUMENTS 3,613,889 A  *  10/1971  Reed .................. B01D 21/0051
                                                          210/522
3,672,511 A  *   6/1972  Watson ................. C10G 33/02
                                                          210/522
(Continued)

FOREIGN PATENT DOCUMENTS

EP        0836876 A1    4/1998
GB        2150039 A     6/1985
(Continued)

OTHER PUBLICATIONS

International Search Report issued for PCT/US2020/015032, dated Apr. 7, 2020 (5 pages).
(Continued)

*Primary Examiner* — Christopher Upton
(74) *Attorney, Agent, or Firm* — Osha Bergman Watanabe & Burton LLP

(57) ABSTRACT

An emulsion separation device including a plurality of inclined plates, a buoyancy device, and an electric field generation system. Also disclosed are systems and methods for the separation of an emulsion into a continuous aqueous phase and a continuous oil phase. The systems may include: a vessel having an emulsion inlet, a continuous aqueous phase outlet, and a continuous oil phase outlet. A separation device may be disposed in the vessel, the separation device including: a plurality of inclined plates and a buoyancy device configured to maintain the plurality of inclined plates between the continuous aqueous phase and the continuous oil phase. An electric field generation system may also be provided and configured to expose the emulsion to an electric field.

20 Claims, 13 Drawing Sheets

(51) Int. Cl.
   *B01D 17/04* (2006.01)
   *B01D 17/12* (2006.01)
   *C10G 33/02* (2006.01)
   *C10G 33/06* (2006.01)

(52) U.S. Cl.
   CPC ......... *B01D 17/042* (2013.01); *B01D 17/047* (2013.01); *B01D 17/12* (2013.01); *C10G 33/02* (2013.01); *C10G 33/06* (2013.01)

(58) Field of Classification Search
   CPC ............... B01D 17/12; B01D 21/0009; B01D 21/0027; C10G 33/02
   USPC .......... 210/748.01, 802, 122, 187, 243, 521, 210/522, 540
   See application file for complete search history.

(56) References Cited

U.S. PATENT DOCUMENTS

| | | | |
|---|---|---|---|
| 4,252,631 A * | 2/1981 | Hovarongkura | B01D 17/06 |
| | | | 204/666 |
| 4,257,895 A | 3/1981 | Murdock | |
| 4,305,819 A * | 12/1981 | Kobozev | B01D 21/0027 |
| | | | 210/521 |
| 4,469,582 A | 9/1984 | Sublette et al. | |
| 5,228,983 A * | 7/1993 | Nims | B01D 21/0009 |
| | | | 210/243 |
| 5,380,417 A | 1/1995 | Essop et al. | |
| 5,865,992 A * | 2/1999 | Edmondson | B01D 17/06 |
| | | | 210/521 |
| 6,315,898 B1 * | 11/2001 | Bull | B01D 17/0211 |
| | | | 210/243 |
| 7,163,624 B2 * | 1/2007 | Nilsen | B01D 17/06 |
| | | | 210/243 |
| 7,425,260 B2 * | 9/2008 | Fujisaki | B01D 21/0045 |
| | | | 210/522 |
| 9,095,790 B2 | 8/2015 | Sams et al. | |
| 9,440,241 B2 | 9/2016 | Akdim et al. | |
| 2005/0040045 A1 | 2/2005 | Nilsen et al. | |
| 2014/0021148 A1 | 1/2014 | Buckner | |
| 2016/0250568 A1 | 9/2016 | Lewis et al. | |
| 2016/0289100 A1 * | 10/2016 | Sprenkel | C10G 33/02 |
| 2016/0332895 A1 | 11/2016 | Hench et al. | |

FOREIGN PATENT DOCUMENTS

| | | |
|---|---|---|
| GB | 2463276 A | 3/2010 |
| JP | S5573286 U | 5/1980 |
| JP | 2014000547 A | 1/2014 |
| MY | 164624 A | 1/2018 |
| WO | 2018124016 A1 | 7/2018 |
| WO | 2018200640 A1 | 11/2018 |

OTHER PUBLICATIONS

Written Opinion issued for PCT/US2020/015032, dated Apr. 7, 2020 (10 pages).

* cited by examiner

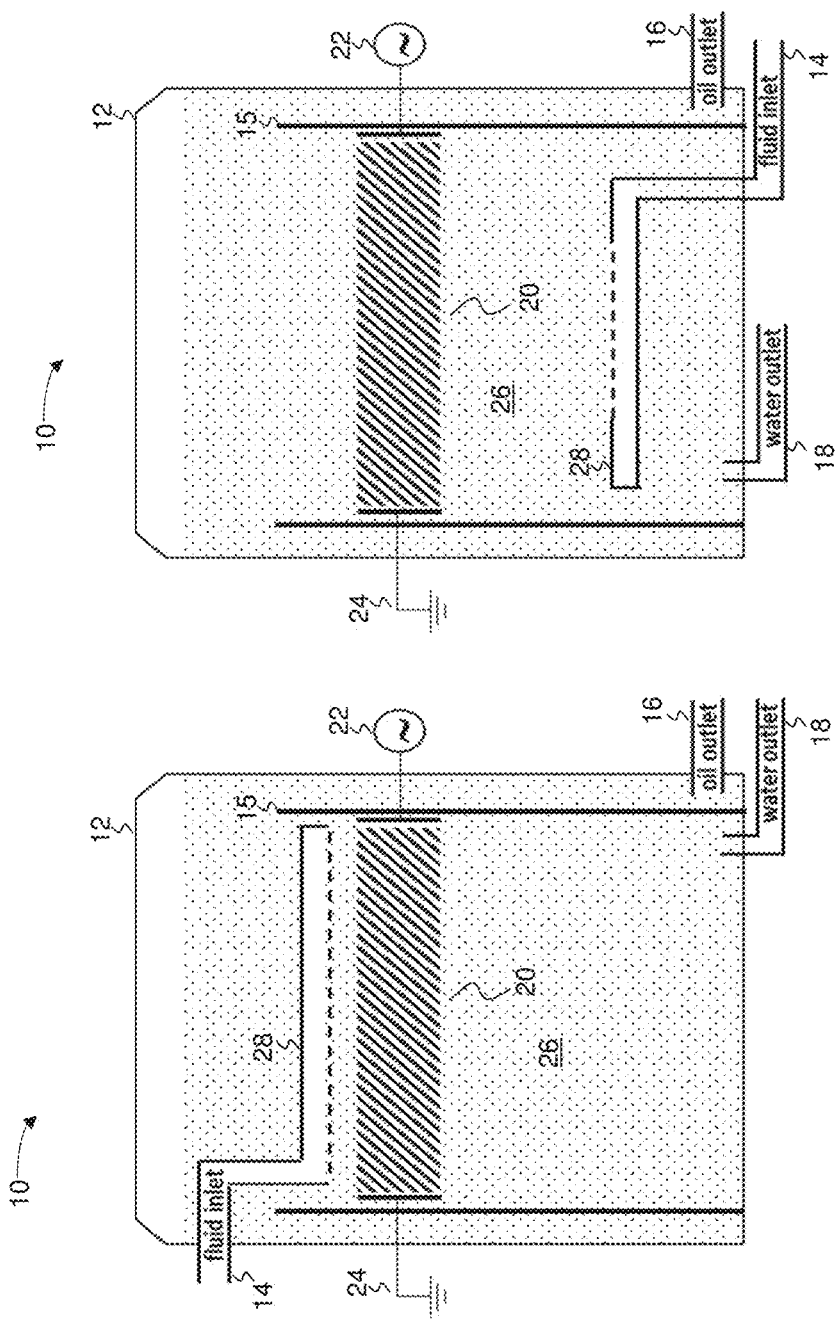

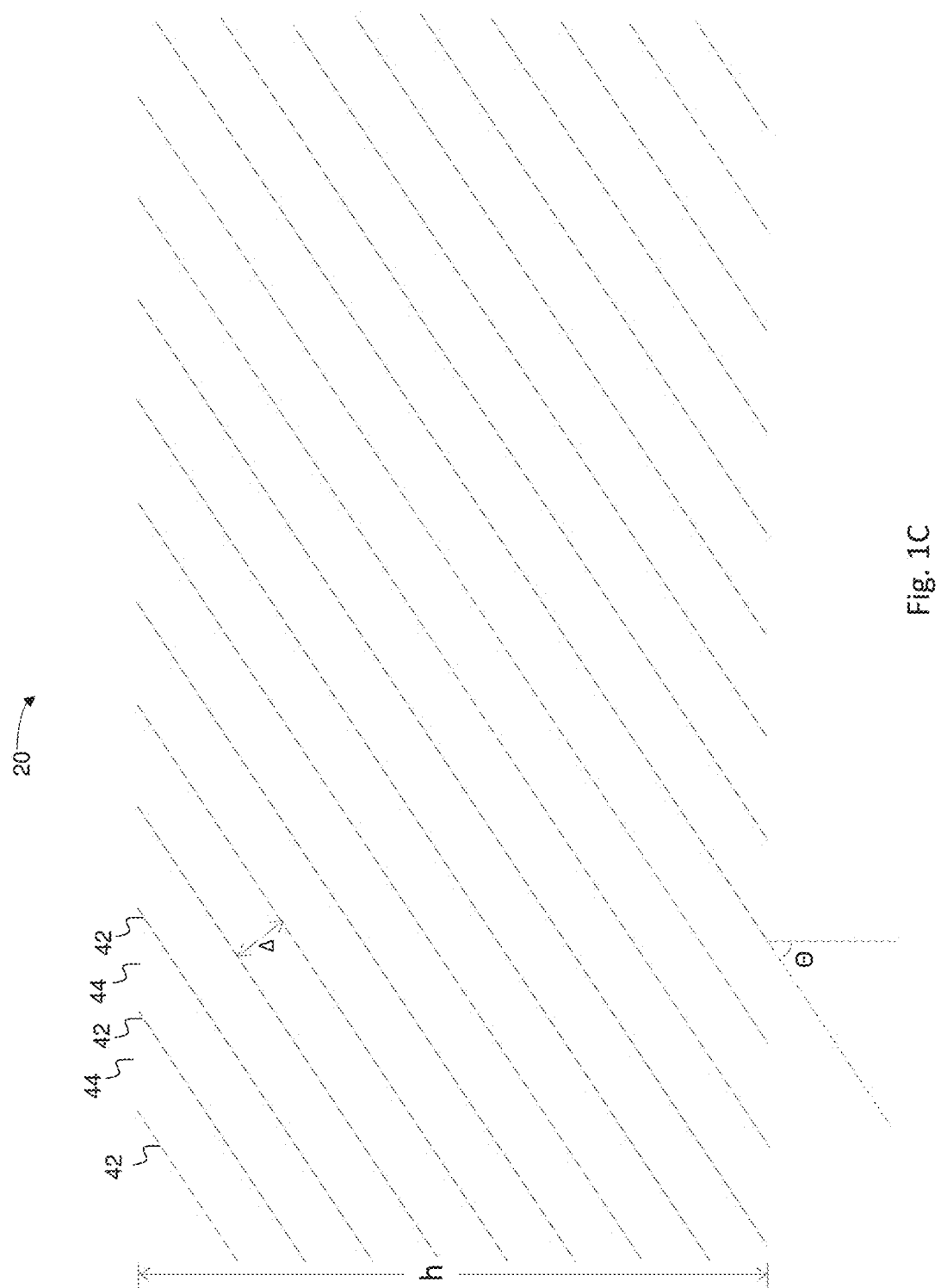

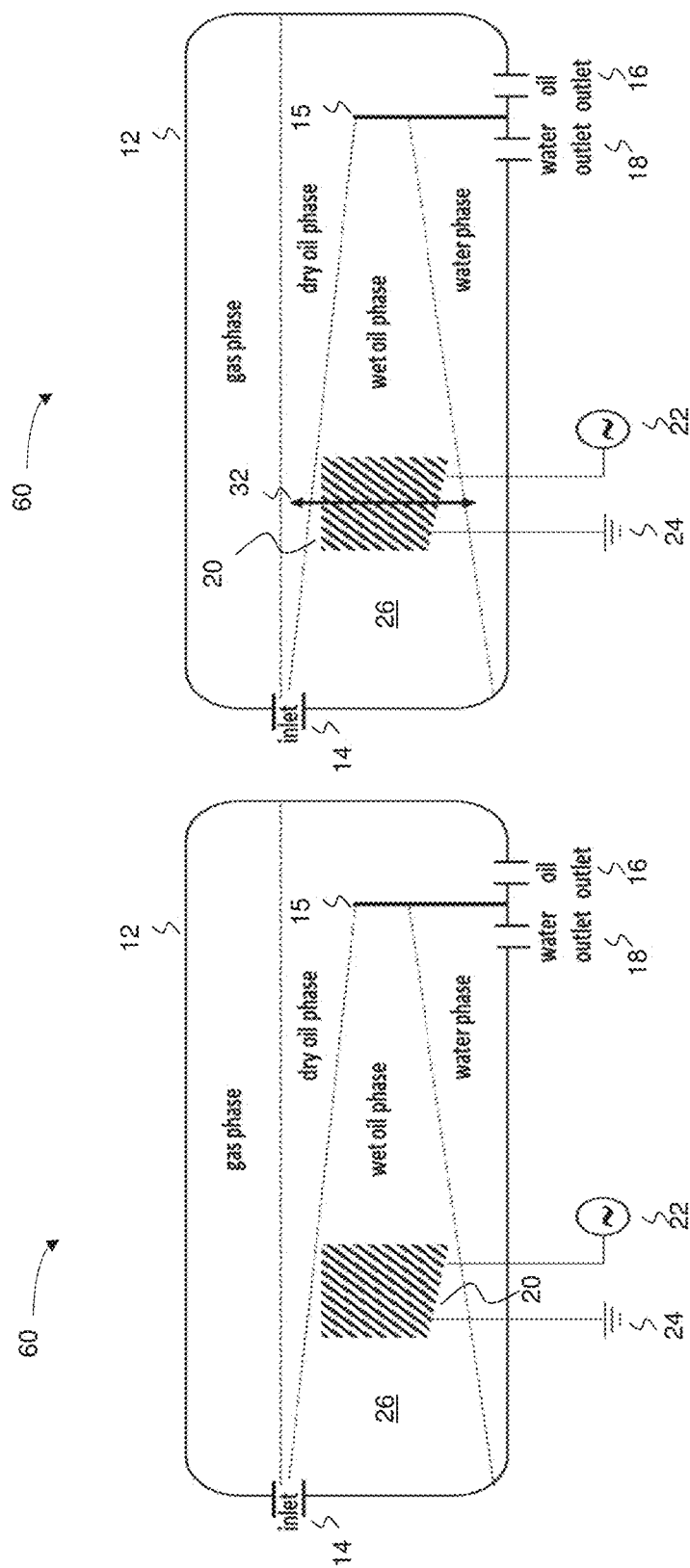

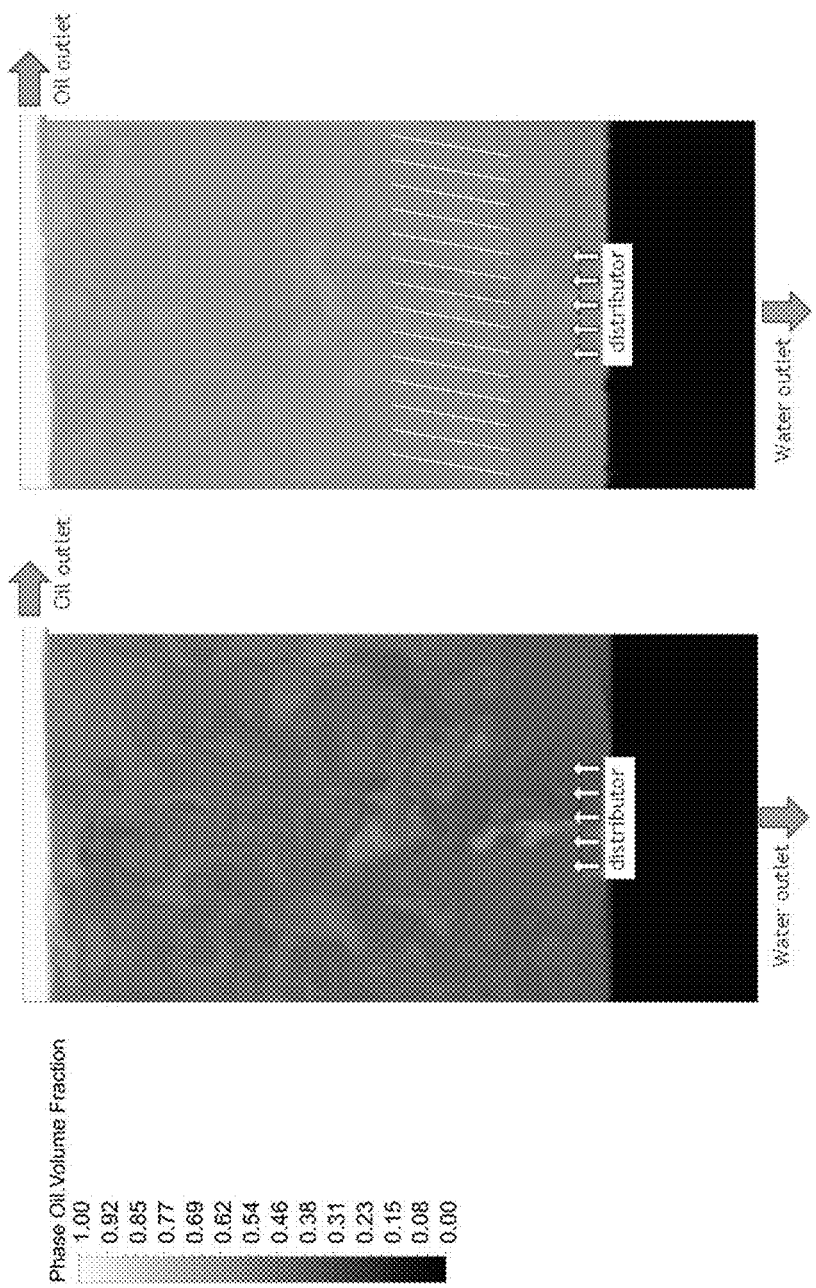

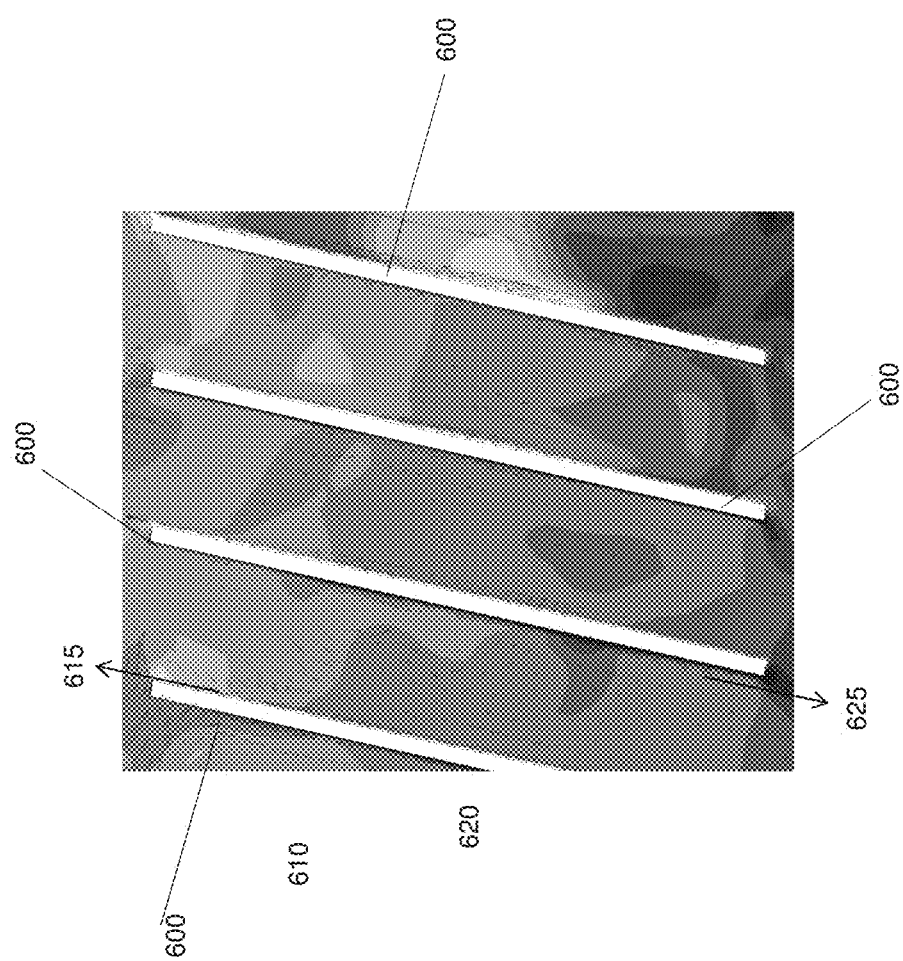

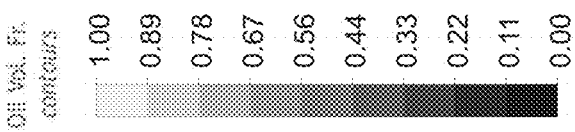
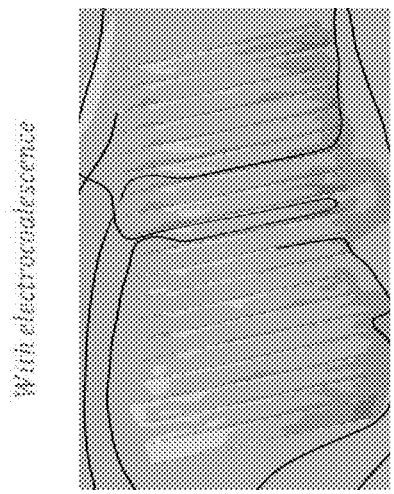
Fig. 9B
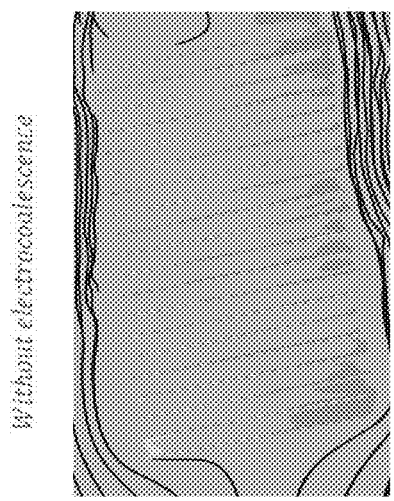
Fig. 9A

FLOATING ASSEMBLY OF INCLINED CHANNELS WITH AN APPLIED ELECTRICAL FIELD FOR THE ACCELERATED ELECTROSTATIC SEPARATION OF WATER-IN-OIL DISPERSIONS

FIELD OF THE DISCLOSURE

Embodiments described herein relate generally to systems and methods for electrostatic coalescence of immiscible components from a mixture. More particularly, embodiments described herein relate to systems, apparatus, and methods for the separation of water from a water-in-oil mixture.

BACKGROUND

The separation of an aqueous phase from an oil phase is an important step in many industrial processes. Typically, gravity force is used to drive the separation processes inside dedicated vessels, taking advantage of the density differences between the aqueous and oil phases. Use of gravity alone, however, may result in residence times generally being very high, especially when the dispersed phase is in the form of droplets with diameters distributed in the 1 micron to 100 micron range. This leads to the adoption of large and costly separation vessels, intensive chemical treatments, and heating.

Various references disclose oil/water separators, and many use a generated electrical field to enhance the separation of the phases. For example, U.S. Pat. Nos. 9,095,790, 4,257,895, US2016/0332895, US2016/0250568, US2005/0040045, U.S. Pat. No. 4,469,582, GB2150039, and WO2018/200640 relate to apparatus used for the separation of oil and water.

SUMMARY OF THE CLAIMED EMBODIMENTS

In one aspect, embodiments disclosed herein relate to a system for the separation of an emulsion into a continuous aqueous phase and a continuous oil phase. The system may include a vessel having an emulsion inlet, a continuous aqueous phase outlet, and a continuous oil phase outlet. A separation device may be disposed in the vessel, and a buoyancy device may be configured to maintain the plurality of inclined plates between the continuous aqueous phase and the continuous oil phase. An electric field generation system may be provided to expose the emulsion to an electric field. The separation device may include a plurality of inclined plates.

In another aspect, embodiments disclosed herein relate to an emulsion separation device configured to separate an emulsion into two continuous phases. The emulsion separation device may include: a plurality of inclined plates; a buoyancy device; and an electric field generation system.

In another aspect, embodiments disclosed herein relate to a system for the separation of an emulsion into a continuous aqueous phase and a continuous oil phase. The system may include a vessel having an emulsion inlet, a continuous aqueous phase outlet, and a continuous oil phase outlet. A separation device may be disposed in the vessel, the separation device including: a plurality of inclined plates; and, a buoyancy device configured to maintain the plurality of inclined plates between the continuous aqueous phase and the continuous oil phase.

In yet another aspect, embodiments disclosed herein relate to a method for separating an emulsion. The method may include feeding an emulsion comprising a light phase and a heavy phase to a separator as described above. An electric field may be generated across the plurality of inclined plates, and the emulsion may be caused to flow through a plurality of inclined channels formed between the plurality of inclined plates, separating the emulsion into a continuous light phase and a heavy phase. The method may further include maintaining a position of the separation device within an emulsion phase intermediate the continuous light phase and continuous heavy phase.

Other aspects and advantages will be apparent from the following description and the appended claims.

BRIEF DESCRIPTION OF DRAWINGS

FIGS. 1A and 1B are schematic illustrations of vertical flow coalescing separators according to embodiments disclosed herein. FIG. 1C is a schematic illustration of an assembly of inclined plates useful with separators according to embodiments herein.

FIGS. 3A and 3B are schematic illustrations of horizontal flow coalescing separators according to embodiments disclosed herein. FIG. 3B further includes a buoyancy assembly according to embodiments herein to maintain a level of the assembly of inclined plates within a wet oil phase or an emulsion layer.

FIGS. 7A and 7B illustrate computational fluid dynamics (CFD) simulation results exhibiting the benefits of separation systems according to embodiments herein.

FIG. 8 illustrates computational fluid dynamics (CFD) simulation results exhibiting the benefits of separation systems according to embodiments herein.

FIGS. 9A and 9B illustrate computational fluid dynamics (CFD) simulation results exhibiting the benefits of separation systems according to embodiments herein.

DETAILED DESCRIPTION

Figures 2A, 2B:
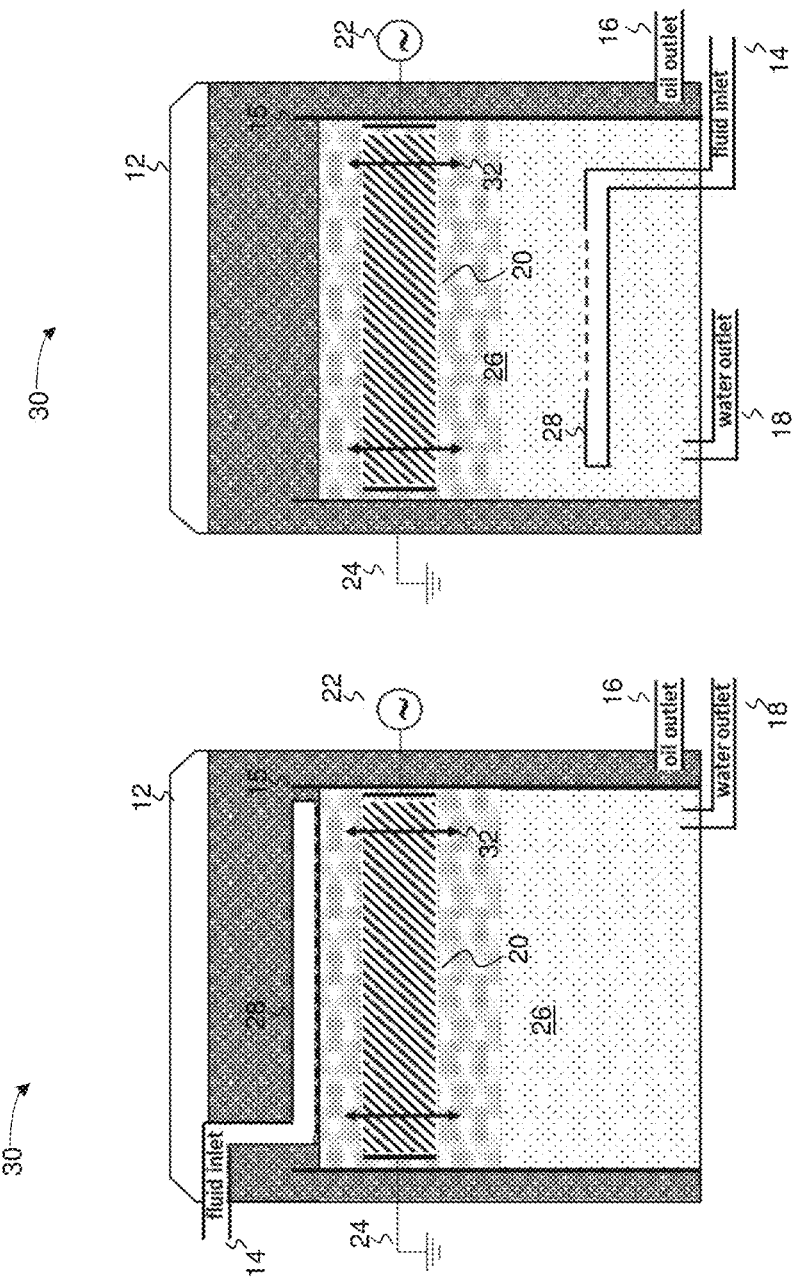
FIGS. 2A and 2B are schematic illustrations of vertical flow coalescing separators according to embodiments disclosed herein, including a buoyancy assembly according to embodiments herein to maintain a level of the assembly of inclined plates within a wet oil phase or an emulsion layer.

Embodiments disclosed herein are directed toward apparatus and methods that may improve the performance of traditional gravity-based separators by accelerating the droplet coalescence and sedimentation process, coalescing a dispersed phase from a continuous phase in an emulsion. For example, embodiments herein may be used for the separation of oil/water emulsions by accelerating the water droplet coalescence and sedimentation processes, among other polar/non-polar mixtures and emulsions. Accordingly, one or more embodiments disclosed herein relate to an assembly of subsystems to enhance the separation of water from emulsions, such as the wet crude oil emulsions encountered in the oil and gas industry.

The term "emulsion," as used herein, includes a mixture of two or more immiscible liquids. In one embodiment, one component of the emulsion (also referred to as the dispersed phase) is stably or unstably dispersed in the other component (also referred to as the continuous phase). It may take seconds to hours to fully separate the mixture of phases in the emulsion by letting them stand undisturbed. In one embodiment, the dispersed phase includes an organic phase and the continuous phase includes an aqueous phase. In another embodiment, the dispersed phase includes an aqueous phase and the continuous phase includes an organic phase. The term "aqueous phase", as used herein, refers to a phase of the emulsion that primarily includes water. The term "organic phase", as used herein, refers to a phase of the emulsion that primarily includes hydrocarbons. The terms "separation vessel," "separator," and "coalescer" and like terms may be used interchangeably herein.

In some embodiments, the emulsion is of the type found in oil production. In some embodiments, the emulsion is of the type found in one or both of chemical production or biological production. In particular embodiments, the emulsion includes crude oil. In some embodiments, the crude oil includes liquid hydrocarbons. In some embodiments, the crude oil may further include gaseous hydrocarbons, solid hydrocarbons, salts, metals, impurities, and combinations thereof. As noted earlier, in some embodiments, the crude oil further includes an aqueous component. In certain embodiments, the dispersed phase is water and the continuous phase is oil, and the emulsion is a water-in-oil emulsion. In such instances, the coalescer may be configured to enhance coalescence of water droplets in a water-in-oil emulsion.

Coalescers or separators according to embodiments herein may include a fluid inlet for introducing a mixed feed into a separator vessel. The fluid inlet may be a simple pipe inlet in some embodiments, or may include a distributor or distribution device for distributing the flow across a height or width of the vessel in other embodiments. Following separation of the mixed feed into a heavy (higher density) phase and a light (lower density) phase, the separation products may be recovered via respective vessel outlets. Depending upon the components being processed, the aqueous phase may be the heavy phase in various embodiments.

Coalescers may be configured as vertical-flow vessels or horizontal flow vessels according to embodiments herein. In a vertical arrangement, the feed may be introduced to the vessel with a primary flow of the heavy and light phases proceeding in the vertical direction, light moving upward, heavy moving downward. In a horizontal arrangement, the feed may be introduced to the vessel proximate a first end of the vessel, with the outlets disposed on an opposite end of the vessel, the separation of the phases occurring while the bulk flow moves in a generally horizontal direction.

Regardless of the flow arrangement, vertical or horizontal, coalescers according to embodiments herein may include an assembly comprising a plurality of vertically inclined plates, providing a plurality of vertically inclined channels therebetween. The emulsion flow may be directed through the plurality of inclined channels, thereby taking advantage of the Boycott effect, which is observed when a liquid composition is allowed to stand in narrow tubes. In such an arrangement, the denser component may settle faster if the tube is inclined as opposed to when the tube is vertical. The motion of particles and droplets dispersed in an immiscible continuous bulk fluid (emulsion) is always vertical under the effect of gravity. This vertical motion necessarily ceases when the settling droplets reach a surface and accumulate into a continuous and separate phase. Accordingly, when droplets settle in an inclined tube rather than a vertical tube, the average settling distance is reduced due to the inclined plates. Once a droplet contacts the upward facing surface, it becomes part of a concentrated layer. The inclined arrangement may also bring another important benefit: as the denser phase collects towards the upward facing surface, the lighter phase may concentrate towards the downward facing surface, causing a minimal counter-flow between the two different phases that can hinder the separation process and increase residence time. The assembly of inclined plates thereby helps bring droplets closer together, improving the separation efficiency.

For vertical-flow separators according to embodiments herein, the inlet(s) may be disposed above the assembly of inclined plates, below the assembly of inclined plates, or both. A downward flowing system (inlet above the assembly of plates) may be useful in embodiments where the emulsion is rich in the aqueous component, as such emulsion may flow more freely in the direction of gravity and pass through the inclined channels below the fluid inlet. An upward flowing system may be used in embodiments where the emulsion is rich in the oil component, as such emulsion may flow more freely in the direction opposite gravity and pass through the inclined channels above the fluid inlet. However, either configuration may be sufficient for separation of oil-rich or aqueous-rich emulsions.

Coalescers according to embodiments herein may also include an electric field generation system. The electric field generator may produce an electric field, such as an alternating current (AC) electric field or a direct current (DC) electric field, across an emulsion. Such electric field may promote separation by electrocoalescence. The electric field may create an electrical surface charge at the droplet interface with the dielectric fluid, leading to the mutual attraction of adjacent droplets. As the water droplets coalesce, the diameter of the droplet increases, allowing the droplets to settle in a separation vessel with reduced residence time. DC electric fields may further provide electrophoresis and consequent droplet migration toward an upward facing surface, in some embodiments.

In some embodiments, the electric field generation system may be provided within the inlet, exposing the emulsion to an electric field prior to the feed entering the coalescer vessel. In other embodiments, an electric field generation system may be provided intermediate the inlet and the assembly of inclined plates.

In yet other embodiments, the electric field generation system may be configured to apply an electric field across the plurality of inclined plates. The present inventors have found that application of an electric field within an arrangement of inclined plates/channels may further accelerate separation of the droplets over that which the inclined plates alone may achieve.

As described above, the combination of inclined plates and an electric field generation system may be used to enhance the separation efficiency of gravity based separators according to embodiments herein. Additionally, it has been found that application of the electric field across the vertically inclined plates further enhances the separation efficiency. The electrostatic forces may promote water droplet coalescence through the application of an electric field across the emulsion, while concurrently the assembly may be designed with inclined paths that minimize the oil/water counter-flow that typically contributes to the delay in the separation process.

Coalescers according to embodiments herein may also include a buoyancy device configured to maintain the assembly at a height within the wet oil phase or emulsion layer, such that the assembly is above the continuous aqueous/water layer and below the continuous oil layer. When there is insufficient water to form a continuous aqueous/water layer or when there is no emulsion layer, the buoyancy device may be redundant and the assembly may be installed at a fixed elevation in the tank or vessel or otherwise maintained at a static elevation within the vessel.

The addition of the buoyancy system may further promote the accelerated coalescence of the aqueous phase in the emulsion. This arrangement may be used, for example, where a clear emulsion layer is formed within the coalescer vessel. Buoyancy systems or devices may be provided that are configured to maintain the position of the inclined channels between the aqueous continuous phase and the oil continuous phase, taking advantage of the principles of density. For example, a typical aqueous continuous phase may have a typical density in the 1-1.2 $g/cm^3$ range, and a typical oil continuous phase may have a typical density in the 0.75-0.95 $g/cm^3$ range. Accordingly, the emulsion of the aqueous component, which may be water, and the oil component may exhibit a density between the densities of the separate continuous phases. Further, viscosity may be factored into the buoyancy device. Viscosity of a wet oil phase may increase with water volume fraction and decreasing droplet size, and can be greater than the viscosities of the separate oil and water continuous phases. Using these rheological properties, it may be possible to ensure that the assembly of inclined channels can be located in the emulsion layer at all times, thus promoting fast separation in the region where separation occurs. Further, where the electric field is applied across the assembly of inclined plates, the buoyancy system may ensure application of the electric field within the emulsion layer.

In some embodiments, the assembly of inclined plates may be connected to a buoyancy device. The buoyancy device may be attached to a top or upper portion of the assembly of inclined plates, in some embodiments, where the buoyancy device is designed to preferentially float in a density layer slightly greater than the density of the light phase, thereby maintaining the inclined plates in the emulsion layer below the buoyancy device. In other embodiments, the buoyancy device may be disposed proximate a bottom or lower portion of the inclined plates, where the buoyancy device is designed to preferentially float in a density gradient slightly less than the density of the heavy phase, thereby maintaining the inclined plates in the emulsion layer above the buoyancy device. Accordingly, the buoyancy system may be designed and sized to maintain the assembly of inclined plates at or within the oil/water interface to maximize the separation performance improvement.

Buoyancy devices according to embodiments herein may include floats filled with or with a combination of inert gases, ceramic or synthetic foams, or low to high density resins in a structure of a protective material either metallic or nonmetallic, particularly in presence of an applied electric field.

In some embodiments, the assembly of inclined plates may themselves be buoyant (i.e., an integral buoyancy device and assembly of inclined plates). For example, the assembly of inclined plates may be configured to have a buoyancy or a buoyancy gradient such that the plates are maintained within the emulsion layer. For example, the assembly of inclined plates may be formed, at least in part, using polymeric or ceramic materials having a density intermediate that of the light and heavy phases. Alternatively, or additionally, the inclined plates may be at least partially hollow, thereby reducing their overall density. Configured to have an appropriate buoyancy, the assembly of inclined plates may maintain itself at an appropriate level within the emulsion layer to provide an enhanced separation efficiency.

In some embodiments, such as where the electric field is applied across the assembly of inclined plates/channels, the inclined plates may be formed from an electrically conductive core surrounded by an insulating layer. The overall buoyancy of the core/insulator plates may thus be appropriately designed to both apply an electric field across the inclined channels as well as to maintain the channels within the emulsion layer.

Embodiments herein may also include a control system that may energizes, de-energize, or control the electric field generation system as a function of the position of the assembly of inclined plates. For example, if the assembly floats at a low position, separation may occur readily, and no electrocoalescence is required. If the assembly floats at a high position, however, separation is harder and electrocoalescence shall be promoted. The floating position, in some embodiments, could also be used as a process monitoring tool to activate or deactivate other process control means (a heating system, a chemical feed system, such as for adding demulsifier chemicals, or a wash water feed system, such as to control wash water injection rates, etc.).

As described above, coalescers according to embodiments herein may include a vessel having internal thereto an assembly of inclined channels and an electric field generation system. The electric field may be advantageously applied across the plurality of inclined channels, thereby enhancing the separation efficiency.

FIGS. 1A and 1B schematically represent a coalescer 10 according to one or more embodiments herein including an electric field applied across the plurality of inclined channels, where like numerals represent like parts. FIG. 1A illustrates an embodiment including downward emulsion flow, while FIG. 1B illustrates an embodiment including an upward emulsion flow.

Coalescer 10 may include a vessel 12, having an internal volume sufficiently sized to provide the residence time needed to separate the emulsion into a light phase and a heavy phase. A fluid inlet 14 may be provided to introduce the emulsion into the vessel 12. Weir 15 may be provided to allow overflow of the separated light phase (such as oil), allowing separate recovery of the light phase via a light phase outlet (oil outlet) 16 and of the heavy phase via a heavy phase outlet (water outlet) 18.

As illustrated in FIGS. 1A and 1B, weir 15 may be cylindrical, forming an internal separation chamber 26 and providing an annulus into which the light phase may flow over the weir to outlet 16. In other embodiments, not illustrated, a single vertical weir 15 may be used, dividing the vessel 12 into two sections.

The coalescer system 10 may also include an assembly of inclined channels 20 and an electric field generation system 22. The electric field generation system 22 may be configured to apply a current across the assembly of inclined channels 20 with the electric current flowing from an electrical supply to electrical ground 24.

As illustrated in FIG. 1A, the fluid inlet may terminate at distributor 28, which may be disposed below the uppermost portion of weir 15. In operation, the emulsion is fed through inlet 14 and distributed into the vessel via distributor 28. The emulsion flows downward in the separation chamber 26 and into the assembly of inclined channels 20. The inclined channels with an electric field applied crosswise via electric field generation system 22 promotes coalescence of the heavy phase, such as dispersed water droplets, and facilitates the countercurrent flow of the lighter and heavier phases in the separation chamber 26. The distribution of the emulsion below the uppermost portion of the weir and flow across the inclined plates with an applied electric field provides for the light phase to separate upward to form a continuous light phase that may accumulate at a top of separation chamber 26 and flow over the top of weir 15, and for a continuous heavy phase to form at a bottom of the separation chamber 26, flowing to heavy phase outlet 18. Water may be drained from the separation chamber 26 manually or based on a level controller, for example, while the oil continuous phase may flow over the weir arrangement and may also be drained manually or based on level control.

As illustrated in FIG. 1B, the fluid inlet 14 may terminate at distributor 28, which may be disposed in a lower portion of separation chamber 26, providing for upward flow of the emulsion into the assembly of inclined channels 20 having an applied electric field via electric field generation system 22. As mentioned above, a downward flowing system (FIG. 1A, having inlet 14/distributor 28 above the assembly of inclined channels 20) may be useful in embodiments where the emulsion is rich in the aqueous component, as such emulsion may flow more freely in the direction of gravity and pass through the inclined channels below the fluid inlet. An upward flowing system (FIG. 1B) may be used in embodiments where the emulsion is rich in the oil component, as such emulsion may flow more freely in the direction opposite gravity and pass through the inclined channels above the fluid inlet.

When the emulsion is fed into the vessel of either FIG. 1A or FIG. 1B, the feed rate may be maintained such that an emulsion layer is maintained above the aqueous continuous layer and below the oil continuous layer. This may be accomplished by controlling the feed rate to the vessel as well as the withdrawal rates of both continuous phases.

Referring now to FIG. 1C, an embodiment of the assembly of inclined channels 20 is depicted. The assembly of inclined channels may include a plurality of inclined plates 42. As the emulsion flows through the plurality of inclined channels 44, the heavy phase collects on an upward facing side of the plates, flowing downward, while the light phase accumulates on a downward facing side of the plates, flowing upward. While not illustrated, support elements may be provided to maintain the inclined plates 42 in the desired special relation.

For inclined channel assemblies used in vertical flow arrangements, the principal dimensional parameters of the inclined plate assembly may be the overall vertical height (h) of the inclined plate assembly, the angle of the plates (theta, $\theta$), and the spacing between plates (delta, $\Delta$). The viscosity of the fluids being separated, the flow rates of the respective phases, and other considerations may impact the overall design with respect to height, h, and spacing, A. The angle of the plates in vertical flow arrangements may be in the range of $0°<\theta<60°$ in some embodiments; in the range of $3°<\theta<45°$ in some embodiments; in the range of $4°<\theta<30°$ in other embodiments, and in the range of $5°<\theta<15°$ in yet other embodiments.

As described above, embodiments herein may further enhance the separation efficiency by maintaining the plurality of inclined channels within the emulsion layer. Referring now to FIGS. 2A and 2B, where like numerals represent like parts, FIGS. 2A and 2B schematically represents a coalescer 30 including a buoyancy device 32. Similar to FIGS. 1A and 1B, the coalescer system of FIGS. 2A and 2B may include a vessel 12, an inlet 14, a heavy phase outlet 18, a light phase outlet 16, and a weir 15. The coalescer systems of FIGS. 2A and 2B may further include a buoyancy assembly 32 configured, according to one or more embodiments herein, to maintain the assembly of inclined channels at a height within the emulsion layer.

An emulsion flows either downward (as illustrated in FIG. 2A) or upward (as illustrated in FIG. 2B) in a vertical separator, similar to FIGS. 1A and 1B. The assembly of inclined channels 20 with an electric field generation system 22 applying and electric field crosswise may promote coalescence of the dispersed water droplets and facilitate the countercurrent flow of lighter and heavier phases in the coalescer 30.

As with the embodiments of FIGS. 1A and 1B, when the emulsion is fed into the vessel of either FIG. 2A or FIG. 2B, the feed rate may be maintained such that an emulsion layer is maintained above the aqueous continuous layer and below the oil continuous layer. This may be accomplished by controlling the feed rate to the vessel as well as the withdrawal rates of both continuous phases.

Referring now to FIGS. 3A and 3B, FIGS. 3A and 3B schematically represent coalescer 60 according to one or more embodiments herein used for horizontal separation of an emulsion, where like numerals represent like parts. Horizontal separators according to embodiments herein may include, similar to FIGS. 1A and 1B, a vessel 12, an inlet 14, a heavy phase outlet 18, a light phase outlet 16, and a weir 15. The coalescer systems of FIG. 3B further includes a buoyancy assembly 32 configured, according to one or more embodiments herein, to maintain a level of the assembly of inclined channels within the emulsion layer.

Horizontal separation requires additional design considerations, as the incoming fluid might see the assembly as an obstacle and might escape the inclined channels or establish backflow paths that would ultimately hinder separation.

According to one or more embodiments disclosed herein, an emulsion separation device may be used in a horizontal separation vessel. As illustrated in FIG. 3A, the emulsion (wet oil phase) is fed to the horizontal separation vessel from the left side, and the aqueous continuous layer (water phase) and oil continuous layer (dry oil phase) are separately withdrawn from the right. As the emulsion flows toward the respective outlets, the upper liquid-liquid boundary may be the interface between the oil continuous phase and the emulsion phase, with the lower boundary being the boundary between the aqueous continuous phase and the emulsion phase. As illustrated in FIG. 3A, the energized inclined plates are located at a fixed positioned such that the apparatus is located within the emulsion phase. However, as illustrated in FIG. 3B, the energized inclined plates may be fitted with a buoyancy system which may be designed to keep the inclined plates in the emulsion layer.

As illustrated, in a horizontal separation vessel, the fluid may flow horizontally and enter the inclined channels. The assembly of inclined channels may have a non-rectangular profile to enable the fluid to enter the inclined channels, while the aqueous component coalesces on the upward facing surface, slide down the surface (either forward or backward depending on the positive or negative inclination) until it exits the channel and collects at the bottom of the separator. Auxiliary barriers or wings, not illustrated, may be inserted at the bottom of the inclined channels to prevent the separated aqueous phase from entering a subsequent channel.

Figure 3C:
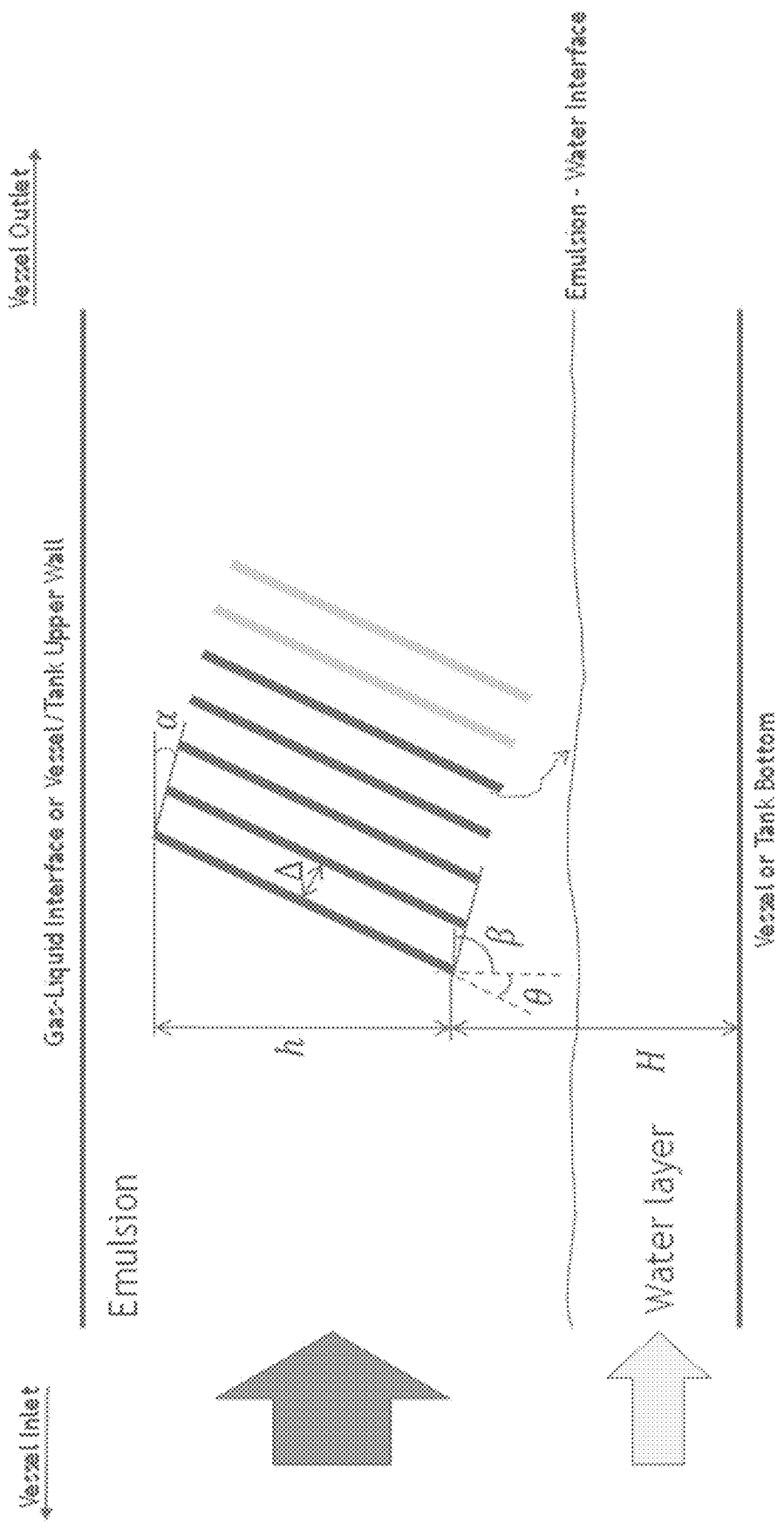
FIG. 3C is a schematic illustration of an assembly of inclined plates useful with horizontal separators according to embodiments herein.

FIG. 3C shows a schematic of the plates in a horizontal separator configuration. The emulsion and water flow is from left to right. The upper boundary for the liquid phase is the gas-liquid interface in a three-phase gas-liquid-liquid separator or a two-phase liquid-liquid separator with a gas cap or layer, or the vessel or tank wall in a two-phase liquid-liquid separator. The oil emulsion-water interface level is also illustrated. The plate assembly may be located at a height H in the emulsion flow above the emulsion-water interface and below the gas-liquid interface or vessel upper wall for the optimal dewatering of the emulsion.

In a horizontal separation vessel, the geometry of the vessel as well as the position of the phase-continuous layers may need to be controlled by controlling the feed rate of the emulsion and the withdrawal rates of the aqueous phase and oil phase in order to ensure continued separation. For inclined plate assemblies used in horizontal flow arrangements, as illustrated in FIG. 3c, where like numerals represent like parts, the principal dimensional parameters of the inclined plate assembly may include the vertical height (h) of the leading plate in the plate assembly (the plate of first incidence by the inlet flow), the angle of the plates (theta, $\theta$), spacing between plates (delta, $\Delta$), and angle of inclination from the horizontal at the top (alpha, a) and bottom (beta, $\beta$) of the assembly. Such range for these parameters may be: $-30°<\alpha<30°$, $-30°<\beta<30°$, $10<h/\Delta<50$, for example. The positive and negative angles are with respect to the direction of emulsion flow.

With respect to the angle of the plates, $\theta$, used for horizontal configurations, such as shown in FIG. 3c, the angle may depend on whether or not the plates are inclined toward or away from the inlet. For rear inclined horizontal configurations (inclined away from the inlet), the angle of the plates in such horizontal flow arrangements may be in the range of $0°<\theta<45°$ in some embodiments; in the range of $3°<\theta<30°$ in some embodiments; $5°<\theta<20°$ in other embodiments, and in the range of $5°<\theta<10°$ in yet other embodiments. For forward inclined horizontal configurations (inclined toward the inlet), the angle of the plates in such horizontal flow arrangements may be in the range of $-55°<\theta<0°$ in some embodiments; in the range of $-45°<\theta<-5°$ in some embodiments; $-35°<\theta<-10°$ in other embodiments, and in the range of $-30°<\theta<-15°$ in yet other embodiments. When defining $\theta$ for horizontal configurations herein, the angle $\theta$ is defined with respect to the direction of emulsion flow, where a positive $\theta$ is used for rear inclined plates (inclined away from inlet) and a negative $\theta$ is used for forward inclined plates (inclined toward the inlet).

When buoyancy devices are used, it may be desirable to limit the freedom of movement of the assembly of vertically inclined plates. For example, vertical channels (not illustrated) along the weir may be mated with tabs (not illustrated) of the assembly of vertically inclined plates to prevent rotation of the plates, such as may occur due to the flow patterns formed within vessel 10. Further, positive stops (shoulders) (not illustrated) may be provided on weir 15 to retain the plate assembly within separation chamber 26 and above/below the distributor 28. Such positive stops may prevent contact of the plate assembly with the distributor, as well as to avoid floating of the plate assembly above the weir 15 or other unwanted movement/positioning of the plate assembly. Still further, the weirs may be configured to allow passage of the electrical signals while allowing freedom of vertical movement of the plate assembly/buoyancy system.

In other embodiments, as illustrated in FIGS. 3A and 3B, the separation vessels may be used for separation of other mixtures besides water-in-oil emulsion. For example, in multiphase, multicomponent separation, there could be a gas phase that is separated such that the upper boundary is the interface between the oil continuous phase and a gas phase in a three-phase gas-liquid-liquid separator or a two-phase liquid-liquid separator with or without a gas cap.

EXAMPLES

Example 1

Figure 4:
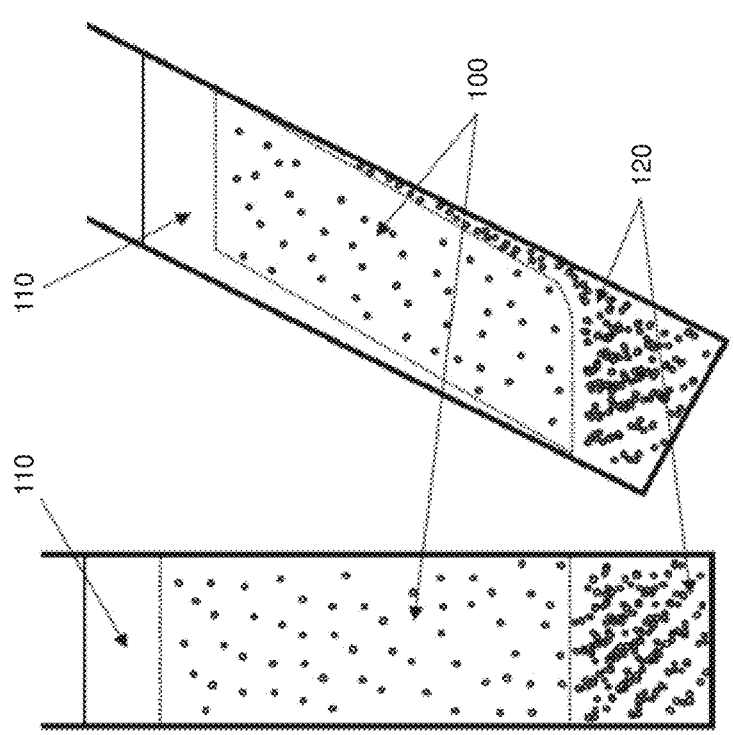
FIG. 4 illustrates visual results observed while testing separation systems according to embodiments herein (inclined, right) as compared to separators without vertically inclined plates (left).

FIG. 4 visually illustrates the sedimentation process in a vertical and inclined tube. As illustrated in FIG. 4, the emulsion layer 100 is located at a height between the less dense oil layer 110 and the more dense water/aqueous layer 120. In the vertical tube, illustrated on the left side of FIG. 4, the water droplets have a greater downward distance to travel before the droplets contact a non-vertical surface or the aqueous layer. In the inclined tube on the right side of FIG. 4, the vertical drop distance is much less. Accordingly, the separation time using the inclined tube may be reduced as the aqueous droplets reach the aqueous phase in a shorter time. Similarly, the oil fraction in the emulsion layer 100 rises and contacts the downward facing inclined surface and combines with the oil continuous phase 110.

Figure 5:
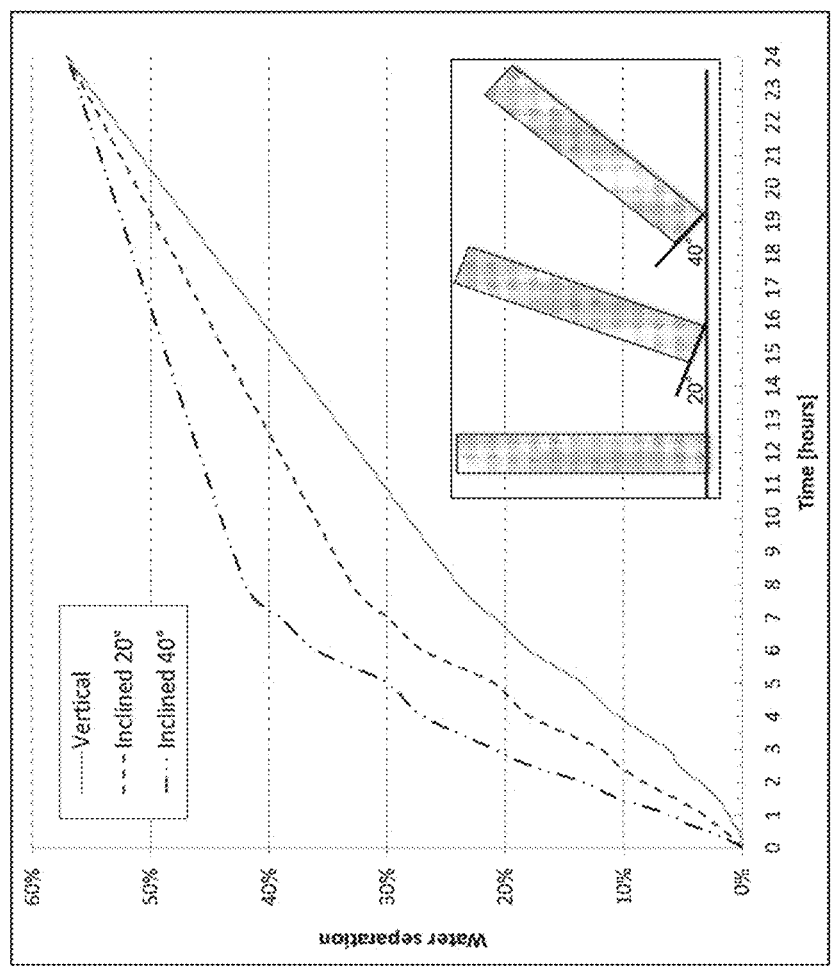
FIGS. 5 and 6 are charts depicting experimental results comparing vertical versus inclined plate separation.

As illustrated in FIG. 5, experimental data quantitatively demonstrates the performance improvement in separation of water-in-model oil emulsions obtained using inclined settling tubes when compared to a vertical settling tube. The model emulsions were prepared by mixing demineralized water and light mineral oil in a 1:2 water to oil ratio (by volume) with a homogenizer, such as an ULTRA-TURRAX T25 homogenizer, available from IKA, for 3 minutes at 13,000 rpm. The emulsions were stabilized with 0.5 wt. % of a 9:1 surfactant blend of SPAN 80 and TWEEN 85. After mixing, water separation was monitored over time, at a controlled temperature of 45° C.

As shown by the results in FIG. 5, the inclination of the sedimentation tubes leads to improvements of the separation rate, although the terminal separation (after 24 hours) is unchanged across the 3 systems. In the specific example described above for FIGS. 2A and 2B, 30% of water separation is reached in 5 hours for a 40° inclination, 7 hours for a 20° inclination, and nearly 11 hours for vertical tubes. This translates in an improvement of the separation speed of 55% for a 40° inclination, and 36% for a 20° inclination over the vertical tube. Improvements are analogous when comparing the times required to reach 10% or 20% of water separation, with percentages ranging between 55% to 61% for the 40° inclination, and between 29% and 38% for the 20° inclination.

Example 2

As it would be impractical to incline large separator vessels or tanks, the assembly, according to one or more embodiments herein, is designed with channels in such a way to create inclined pathways for the emulsion layer. Experiments were conducted to test embodiments herein versus an analogous system having straight pathways but equivalent from a section reduction standpoint. Two different internal structures were tested comparatively with water-in-crude oil emulsions while inserted in a cylindrical test tube of 200 ml capacity.

The crude oil emulsions were prepared by mixing a synthetic brine having 0.5% wt. of sodium chloride and Arab Light (AL) crude oil in a 1:4 brine to oil ratio with a homogenizer for 30 seconds at 8,000 rpm at an ambient temperature of 20° C. After mixing, the fluid was poured into the 200 ml test tube and water separation was monitored over time. At the same time, an electric field was applied to the emulsion layer. The electric field was generated through adhesive aluminum strips applied on the outer test tube surface. The dimensions of the strips were sized to apply the electric field in correspondence of the perforated internals volume. The applied voltage equaled 9 kV, producing an electric field of 1.8 kV/cm at 1 kHz. While this one method of generating an electric field was tested, many other similar methods may be used and are contemplated herein.

Figure 6:
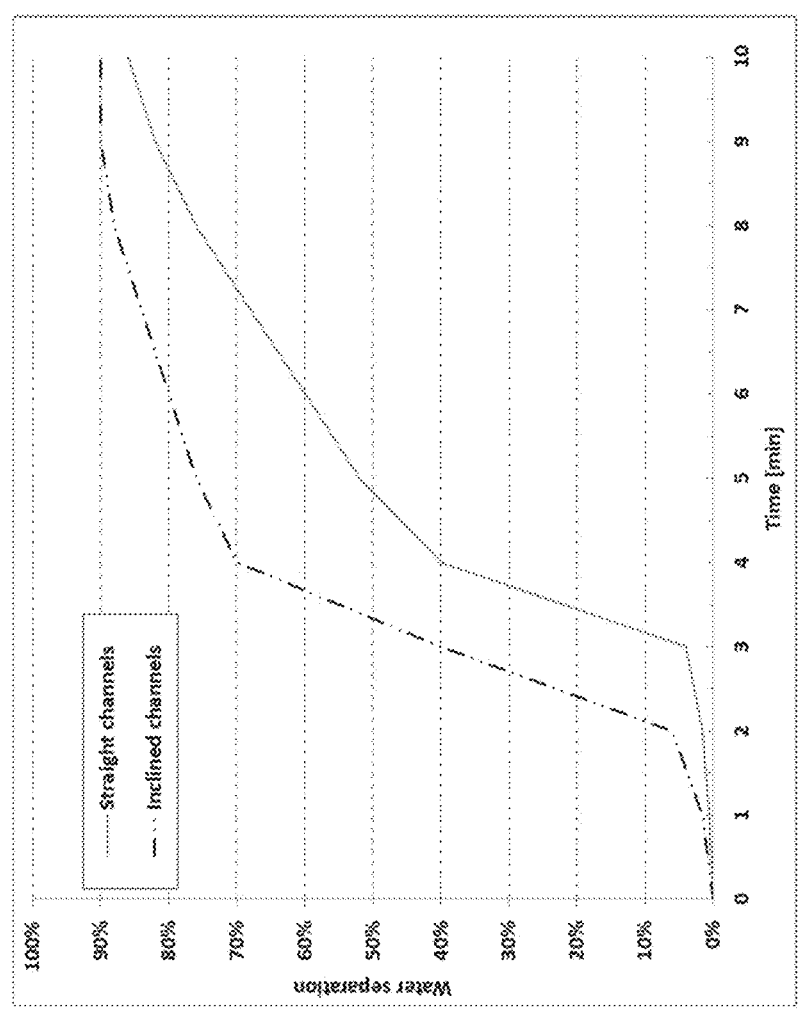

FIG. 6 shows the results of the testing with inclined channels and electric field generation compared to vertical tubes with electric field generation. As shown, the experimental data is consistent with that observed in FIG. 5. The synergy of the inclined paths and electric field provides a significant separation performance gain over the vertical paths and electric field.

As shown in each of FIGS. 5 and 6, the systems' performance starts to diverge shortly after the onset of the separation process and then converge again to a terminal separation value at the end of the experiment. As seen in FIG. 6, separation values of 10% to 40% are reached on average 30% faster with inclined paths internal than with straight paths internal. The gain in separation time further increases to 46% at 70% separation. Accordingly, improvements in separation efficiency are expected to be between 30% and 50% for systems according to embodiments herein.

Example 3

Different configurations of inclined channels and alternating current field generation have been tested for water-oil emulsion separation systems, and are described below, with computational fluid dynamics (CFD) simulations of the oil-water emulsion flow in vertical and horizontal vessels or tanks performed for each configuration. Such configurations are:
(1) Vertical separation tank with up-flow and down-flow, having a fixed assembly of energized inclined channels;
(2) Vertical separation tank with up-flow and down-flow, having a floating assembly of energized inclined channels;
(3) Horizontal separation vessel, having a fixed or floating assembly of energized inclined channels.

FIG. 7A illustrates the distribution of oil concentration (measured in volume fraction) in a vertical separator with the flow distributor located in proximity of the oil/water interface at a lower elevation in the vessel. As illustrated, the emulsion is injected above the interface in the upward direction, but could also be injected below the emulsion-aqueous continuous interface. The oil outlet may be an overflow (as illustrated in FIGS. 7A and 7B) or a submerged weir arrangement (as illustrated in FIGS. 1A, 1B, 2A, 2B, 3A, and 3B). The tank in FIG. 7A has no inclined tubes or electrical field. As illustrated, in such conventional configuration, the emulsion layer has an oil concentration from approximately 0.38 to 0.54 until just below the continuous oil phase, with an average oil concentration of 0.45.

FIG. 7B illustrates the distribution of oil concentration (measured in volume fraction) in a vertical separator with the flow distributor located in proximity of the emulsion-aqueous continuous interface at a lower elevation in the vessel. The emulsion is injected above the interface in the upward direction, but could also be injected below the interface. The oil outlet can be an overflow (as illustrated) or a submerged weir arrangement (as illustrated in FIGS. 1A, 1B, 2A, 2B, 3A, and 3B). The tank, as illustrated in FIG. 7B, is equipped with an assembly of 10° inclined plates (10° from vertical) that produce the Boycott effect on the separating emulsion. As illustrated by the results, in such a configuration, the emulsion layer has an oil concentration from approximately 0.54 to 0.77 until just below the continuous oil phase, with an inlet oil concentration of 0.70.

Although the water interface level between the continuous aqueous phase and the emulsion is the same in both configurations, the emulsion layers have different oil concentrations as indicated by the gradient scale. Accordingly, the inclined plates may allow for a significantly higher amount of water to be removed from the tank, such that at steady state the emulsion layer is more oil rich when using separation channels than without.

FIG. 8 illustrates a zoomed-in view of the inclined plates/channels region from FIG. 7B. As can be seen, the fluid circulation between the plates 600 shows the density-driven flow induced by the separating oil and water. The oil distribution shows increased oil concentration 610 on the lower side of the upper plates (downward facing surface) and increased water concentration 620 on the upper side of the lower plates (upward facing surface). The higher water concentration water flows off the lower tip of the plate (illustrated in the direction of arrow 625) while the higher oil concentration flows off the upper tip of the plate (illustrated in the direction of arrows 615).

Example 4

A Computational Fluid Dynamics modeling study was performed for an oil-water emulsion flow in the horizontal configuration of the energized inclined plates. The emulsion fed to the horizontal separator is a 70% oil, 30% water emulsion. An Eulerian-Eulerian multiphase modeling methodology was implemented to determine the separation between the two phases. The water is dispersed in the oil with a mean droplet size of 100 μm. With electrocoalescence, the mean droplet size in the emulsion grows to a presumed 200 μm. FIGS. 9A and 9B illustrated the emulsion flow through an assembly of plates having θ, α and β equal to 15°, −5° and −5°, respectively. For the smaller droplet size distribution without using an electric field, as illustrated by FIG. 9A, some separation in the oil-water flow occurs as illustrated by the gradients in the oil concentration, with the oil volume fraction being between 0.69 and 0.85, with minimal formation of an aqueous rich fraction. With the effect of using an electric field, illustrated in FIG. 9B, the separation of water from the oil emulsion has an oil volume fraction of 0.77 to 0.92, with increased formation of an aqueous rich fraction (a fraction having a 0.46 oil volume fraction or less).

Figure 10:
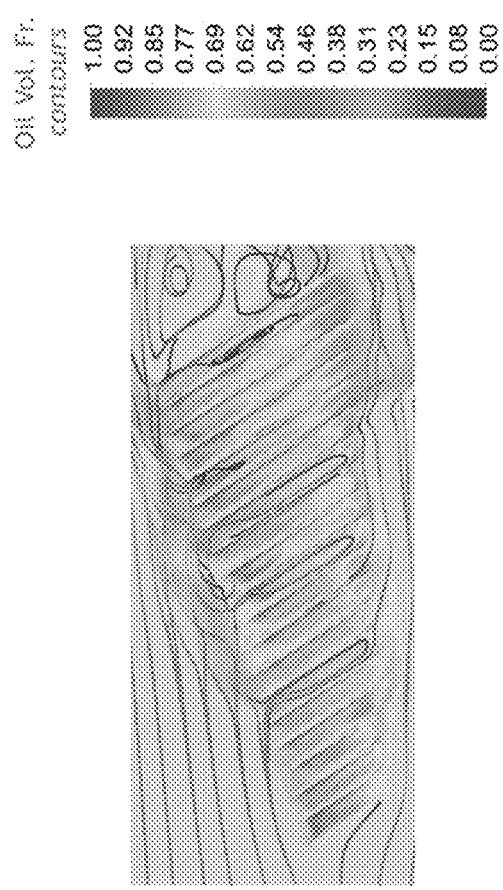
FIG. 10 illustrates computational fluid dynamics (CFD) simulation results exhibiting the benefits of separation systems according to embodiments herein.

FIG. 10 illustrates the effect of increasing the inclination of the plates towards the direction of flow while simultaneously increasing the horizontal alignment angle on the top of the assembly. As seen, such arrangement improves the capture of the emulsion and promotes increased separation of water. These results are based on an assembly of plates having θ, α and β equal to 30°, −20° and −5°, respectively.

Figure 11:
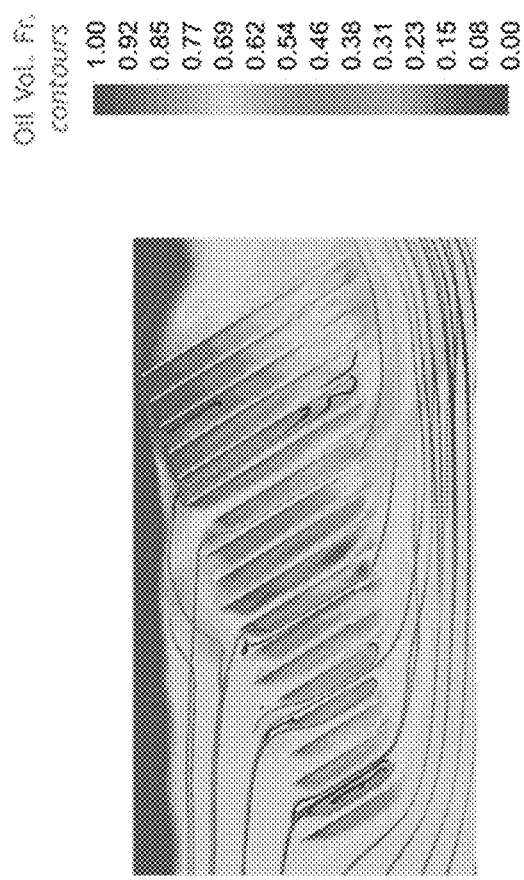
FIG. 11 illustrates computational fluid dynamics (CFD) simulation results exhibiting the benefits of separation systems according to embodiments herein.

Finally, FIG. 11 illustrates the effect of locating the assembly at a greater height within the vessel, such as in contact with the oil continuous phase. The geometry of the assembly is the same as that detailed with respect to FIG. 10, but the inclined plate assembly is located in proximity of the oil continuous layer. Oil and the emulsion layer are directed into the inclined channels and are ejected at a lower level of the vessel, causing potential re-entrainment and mixing with the aqueous fraction. Accordingly, providing the assembly with a buoyancy device configured to keep the assembly in the emulsion phase may improve the continuous and accelerated separation of the emulsion with minimal re-entrainment of separated fractions.

As described above, coalescers or separation systems according to embodiments herein may include an assembly of vertically inclined channels, an electric field generation system, which in some embodiments may be applied across the assembly of vertically inclined channels. Further, embodiments herein may include a buoyancy system to maintain the assembly of vertically inclined channels within the emulsion phase. Each of these features may promote a more efficient separation of the emulsion; the synergies achieved by combined use of these features further promotes efficient separation above that which could be achieved by any of these features alone.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A system for the separation of an emulsion into a continuous aqueous phase and a continuous oil phase, the system comprising:
    a vessel having an emulsion inlet, a continuous aqueous phase outlet, and a continuous oil phase outlet; and
    a separation device disposed in the vessel, the separation device comprising:
        a plurality of inclined plates; and
        a buoyancy device configured to maintain the plurality of inclined plates between the continuous aqueous phase and the continuous oil phase;
    an electric field generation system configured to expose the emulsion to an electric field by applying an electric field across the plurality of inclined plates; and
    a control system configured to energize or de-energize the electric field generation system as a function of the position of the plurality of inclined plates.

2. The system of claim 1, wherein the electric field generation system is disposed in proximity to the emulsion inlet.

3. The system of claim 1, wherein the electric field generation system is disposed on the separation device.

4. The system of claim 1, wherein the control system is further configured to:
    activate a heating system, deactivate the heating system, or control the heating system, as a function of the position of the plurality of inclined plates;
    activate a chemical feed system, deactivate the chemical feed system, or control the chemical feed system, as a function of the position of the plurality of inclined plates; and/or
    activate a wash water injection system, deactivate the wash water injection system, or control the wash water injection system, as a function of the position of the plurality of inclined plates.

5. The system of claim 1, wherein the electric field generation system is an alternating current electric field generation system.

6. The system of claim 1, wherein the electric field generation system is a direct current electric field generation system.

7. The system of claim 1, wherein the vessel is a vertical separation vessel.

8. The system of claim 1, wherein the vessel is a horizontal separation vessel.

9. The system of claim 1, wherein a submerged weir is located between the continuous aqueous phase outlet and the continuous oil phase outlet.

10. The system of claim 1, wherein the system for the separation of an emulsion comprises a vertical flow separator, and wherein the plurality of inclined plates has a plate angle (theta, $\theta$) defining an angle of inclination from vertical, wherein $5°<\theta<15$.

11. The system of claim 1, wherein the system for the separation of an emulsion comprises a horizontal flow separator, and wherein the plurality of inclined plates has a vertical height (h) of a leading plate in the assembly, a plate angle (theta, $\theta$) defining angle of inclination from vertical, a distance between adjacent plates (delta, $\Delta$), an angle of inclination from horizontal at a top of the inclined plates (alpha, $\alpha$) and an angle of inclination from horizontal at a bottom (beta, $\beta$) of the inclined plates, wherein $-30°<\alpha<30°$, $-30°<\beta<30°$, and $10<h/\Delta<50$, and wherein:
    for a rear inclined plate configuration, $5°<\theta<20°$, and
    for a forward inclined plate configurations $-35°<\theta<-10°$, where $\theta$ is defined with respect to the direction of emulsion flow.

12. The system of claim 1, wherein the buoyancy device and the plurality of inclined plates are integral, the inclined plates having a buoyancy to maintain the plurality of inclined plates between the continuous aqueous phase and the continuous oil phase.

13. An emulsion separation device configured to separate an emulsion into two continuous phases, the emulsion separation device comprising:
    a plurality of inclined plates;
    a buoyancy device configured to maintain the plurality of inclined plates between the two continuous phases;
    an electric field generation system configured to apply an electric field across the plurality of inclined plates; and
    a control system configured to energize or de-energize the electric field generation system as a function of the position of the plurality of inclined plates.

14. The emulsion separation device of claim 13, wherein the buoyancy device is configured to maintain the plurality of inclined plates between a first continuous phase and a second continuous phase.

15. A system for the separation of an emulsion into a continuous aqueous phase and a continuous oil phase, the system comprising:
    a vessel having an emulsion inlet, a continuous aqueous phase outlet, and a continuous oil phase outlet;
    a separation device disposed in the vessel, the separation device comprising:
        a plurality of inclined plates; and
        a buoyancy device configured to maintain the plurality of inclined plates between the continuous aqueous phase and the continuous oil phase; and
    a control system configured to activate, deactivate, or control a heating system, a chemical feed system, and/or a wash water injection system as a function of the position of the plurality of inclined plates.

16. The system of claim 15, wherein the system for the separation of an emulsion comprises a vertical flow separator, and wherein the plurality of inclined plates has a plate angle (theta, θ) defining an angle of inclination from vertical, wherein 5°<θ<15.

17. The system of claim 15, wherein the system for the separation of an emulsion comprises a horizontal flow separator, and wherein the plurality of inclined plates has a vertical height (h) of a leading plate in the assembly, a plate angle (theta, θ) defining angle of inclination from vertical, a distance between adjacent plates (delta, Δ), an angle of inclination from horizontal at a top of the inclined plates (alpha, α) and an angle of inclination from horizontal at a bottom (beta, β) of the inclined plates, wherein −30°<α<30°, −30°<β<30°, and 10<h/Δ<50, and wherein:

for a rear inclined plate configuration, 5°<θ<20°, and
for a forward inclined plate configurations −35°<θ<−10°, where θ is defined with respect to the direction of emulsion flow.

18. The system of claim 15, wherein the buoyancy device and the plurality of inclined plates are integral, the inclined plates having a buoyancy to maintain the plurality of inclined plates between the continuous aqueous phase and the continuous oil phase.

19. A method for separating an emulsion, comprising:
feeding an emulsion comprising a light phase and a heavy phase to a separator comprising a separation device, the separation device comprising:
a plurality of inclined plates; and
a buoyancy device configured to maintain the plurality of inclined plates between the continuous aqueous phase and the continuous oil phase;
generating an electric field across the plurality of inclined plates;
flowing the emulsion through a plurality of inclined channels formed between the plurality of inclined plates, separating the emulsion into a continuous light phase and a heavy phase;
maintaining a position of the separation device within an emulsion phase intermediate the continuous light phase and continuous heavy phase; and
energizing and de-energizing the electric field as a function of the position of the separation device.

20. The method of claim 19, further comprising:
activating a heating system, deactivating the heating system, or controlling the heating system, as a function of the position of the separation device;
activating a chemical feed system, deactivating the chemical feed system, or controlling the chemical feed system, as a function of the position of the separation device; and/or
activating a wash water injection system, deactivating the wash water injection system, or controlling the wash water injection system, as a function of the position of the separation device.

* * * * *